(12) United States Patent
Tomlinson

(10) Patent No.: US 6,547,049 B1
(45) Date of Patent: Apr. 15, 2003

(54) PARTICLE VIBRATION DAMPER

(75) Inventor: Geoffrey R Tomlinson, Stockport (GB)

(73) Assignee: Rolls-Royce plc, London (GB)

( * ) Notice: Subject to any disclaimer, the term of this patent is extended or adjusted under 35 U.S.C. 154(b) by 35 days.

(21) Appl. No.: 09/696,237

(22) Filed: Oct. 26, 2000

(30) Foreign Application Priority Data

Nov. 5, 1999 (GB) .............................................. 9926199

(51) Int. Cl.$^7$ ................................................. B64C 1/00
(52) U.S. Cl. ...................... 188/379; 416/248; 52/720.1
(58) Field of Search ........................... 267/140.4, 141.4; 248/636; 188/268, 378–380; 52/167.6, 167.8, 720.1; 416/248; 74/574

(56) References Cited

U.S. PATENT DOCUMENTS

| | | | |
|---|---|---|---|
| 4,706,788 A | 11/1987 | Inman | |
| 5,482,260 A | 1/1996 | Schmidt | |
| 5,855,260 A | * 1/1999 | Rubin | 188/379 |
| 5,924,261 A | * 7/1999 | Fricke | 52/720.1 |
| 6,224,341 B1 | * 5/2001 | Fricke | 416/248 |

FOREIGN PATENT DOCUMENTS

| | | |
|---|---|---|
| GB | 2 269 988 A | 3/1994 |
| WO | PCT/SE85/00203 A | 12/1985 |
| WO | PCT/US97/16575 A | 3/1998 |

* cited by examiner

Primary Examiner—Christopher P. Schwartz
(74) Attorney, Agent, or Firm—W. Warren Taltavull; Manelli, Denison & Selter PLLC

(57) ABSTRACT

A particle vibration damper for a vibrating component is disclosed which comprises a body having a chamber and a plurality of particles, wherein the chamber is partially filled with the plurality of particles, the particle vibration damper, in use, is disposed on or in a vibrating component.

27 Claims, 5 Drawing Sheets

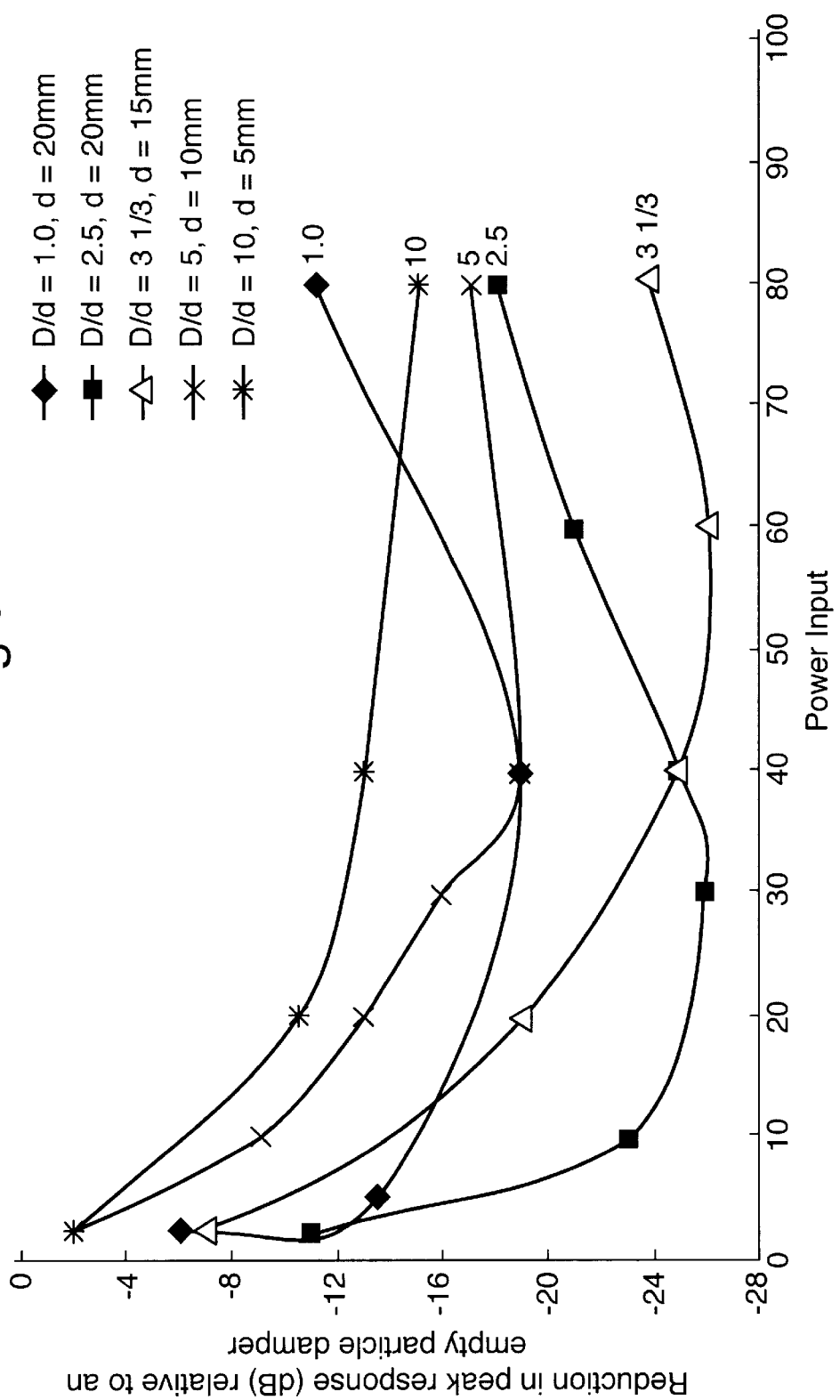

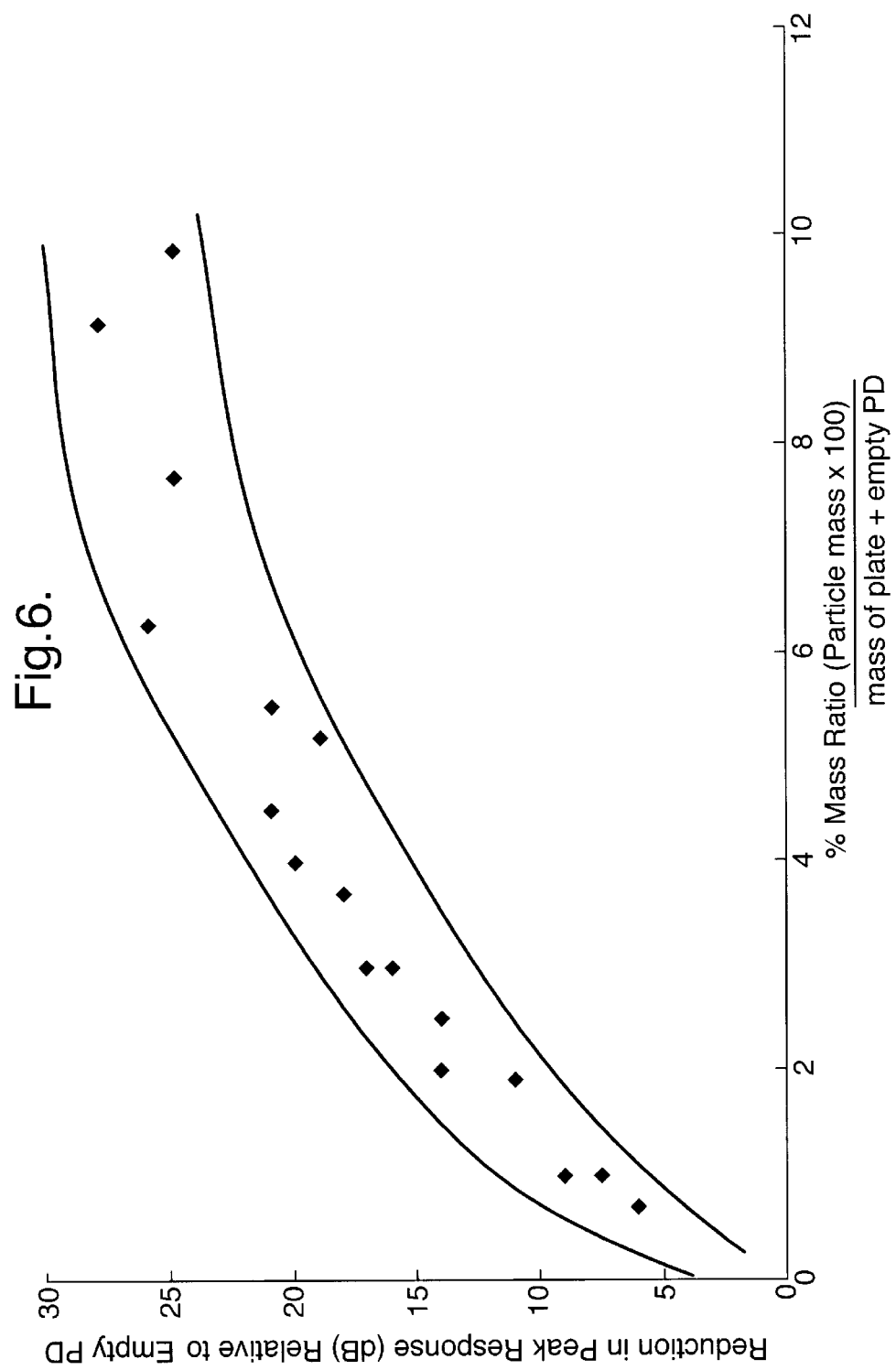

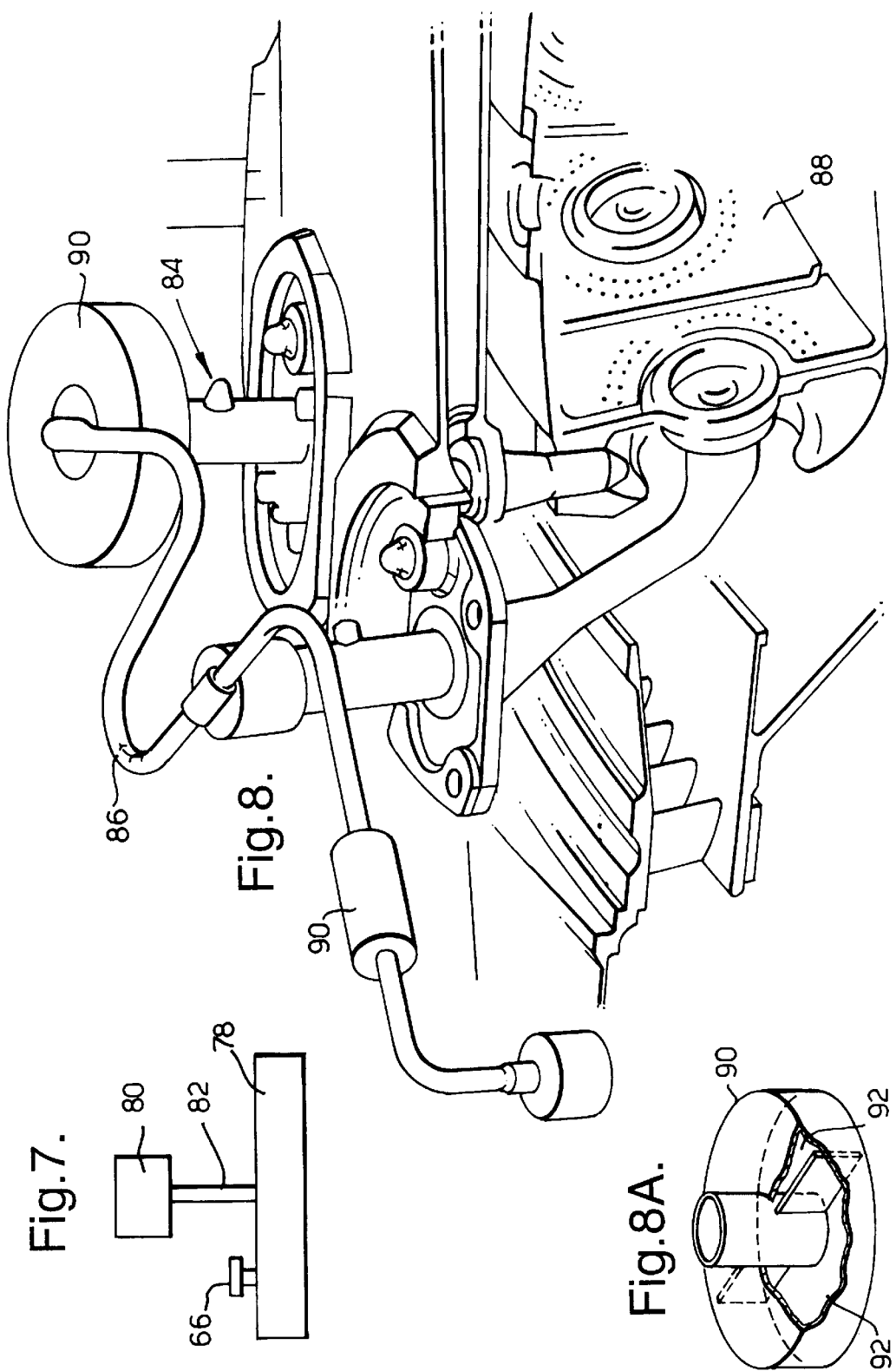

PARTICLE VIBRATION DAMPER

FIELD OF THE INVENTION

The present invention relates to a particle vibration damper which is associated with controlling vibration of a vibrating component and in particular a combustor system component of a gas turbine engine or a component of a machining operation.

BACKGROUND OF THE INVENTION

The combustor system comprises a combustor chamber, a transition duct and an annular distribution chamber. The transition duct transmits hot gases from the combustion chamber to the annular distribution chamber, the hot gases then proceed into a turbine stage thereby driving the turbine.

In order to meet NOx (oxides of nitrogen) and CO (carbon monoxide) emission level requirements, turbulence of a fuel and air mixture is promoted to give acceptable combustion emissions. However, increasing the turbulence during the combustion process, to reduce emission levels, causes an increase of combustor noise which leads to an increase in vibratory stresses in the combustor system components. Combustor system components are vulnerable to high cyclic fatigue failure when the natural frequency of the component coincides or is close to coinciding with the acoustic frequency of the combustion process causing resonance of the component and consequently high vibratory amplitudes and hence high stresses in the component.

During a machining operation, for instance milling a metallic component, it is common for chatter to occur if the tooling or workpiece are of insufficient rigidity. Chatter is the vibration of the milling tool relative to the workpiece which results in either a reduction in the quality of the surface finish being machined or an increase in the machining process time where a better surface finish is required. In the manufacture, for instance, of aero-engine blisks this is of particular importance as the tough nature of the material, titanium, to be machined and the flexibility and low inherent damping of the workpiece severely curtails machining rates.

WO9812449 discloses a damping system for vibrating members of rotating hollow components of turbomachinery. The hollow components are filled with a low density (specific gravity of less than 1.5) granular fill which provides damping of frequencies in the range 100–500 Hz. SUMMARY OF THE INVENTION It is an object of the present invention to provide a vibration damper for non-rotating engine components and in particular combustor system components of a gas turbine engine which increases the working life and reliability of the components.

It is a further object of the present invention to provide a particle vibration damper for damping vibrations of vibrating structures which may be temporarily or permanently disposed to regular or irregular workpiece and tooling geometries, may operate in extreme environmental conditions, may be used where access is limited and which has a reduced weight penalty.

According to the present invention there is provided a particle vibration damper for a vibrating component comprising a body having a chamber and a plurality of particles, the chamber partially filled with a plurality of particles, the particle vibration damper, in use, disposed to a vibrating component.

Preferably the particle vibration damper is mounted on a pedestal, the pedestal attached to the vibrating component.

Alternatively the body has more than one chamber.

Preferably each chamber is partially filled with particles of substantially the same size.

Alternatively each chamber is partially filled with particles of more than one discrete size. Alternatively each of the chambers is partially filled with a plurality of particles of substantially the same size, each plurality of particles in each chamber being of a different discrete size.

Preferably the particles are substantially spherical. Preferably the particles are substantially spherical with a diameter of 0.6 millimeters. Alternatively the particles are substantially spherical with a diameter in the range of 0.1 to 5.0 millimeters.

Preferably the particles are manufactured from steel but alternatively are metallic. Alternatively the particles are manufactured from ceramic material.

Preferably the chamber is filled with particles to between 95 and 100 percent by volume. More specifically, the chamber is filled with particles to 95 percent by volume. Alternatively each of the chambers is filled with particles to 95 percent by volume. Alternatively each of the chambers is filled with particles to a different percentage by volume of each chamber.

Alternatively, the chamber is filled with particles to a percentage volume fill such that the particles become fluidised by the vibrations of the vibrating component.

Preferably the body of the particle vibration damper is manufactured from steel, but alternatively any metallic substance may be used. Alternatively the body of the particle vibration damper is manufactured from ceramic material.

Preferably the body of the particle vibration damper is substantially cylindrical. Preferably, the cylindrical particle vibration damper comprises a D/r ratio of greater than 5. Alternatively the body of the particle vibration damper is substantially parallelepiped.

Preferably the body of the particle vibration damper comprises a chamber with a volume of 50000 cubic millimetres.

Preferably the vibrating component is an engine component. Preferably, the engine component is any one of the group comprising a transition duct, a combustion chamber. Alternatively, the vibrating component is any one of a workpiece, a machine tool, a machine. Preferably, the workpiece is subject to a machining operation.

Preferably the particle vibration damper is disposed to the vibrating component by temporary means.

Preferably the component, of the gas turbine engine, vibrates in the frequency range 200–1200 Hertz.

Preferably the gas turbine engine is an industrial gas turbine engine or alternatively a gas turbine engine for an aircraft or a gas turbine engine for a marine vessel.

Preferably a method of damping the vibrations of a vibrating component comprises the steps of, locating the position of the greatest amplitude of vibration on an engine component and disposing a vibration damping device on the component at the position of the greatest amplitude of vibration.

BRIEF DESCRIPTION OF THE DRAWINGS

A specific embodiment of the invention will now be described by way of example with reference to the accompanying drawing in which:

FIG. 5 is a graph showing the relationship between the reduction in peak response (dB) relative to an empty particle damper device and power input.

FIG. 6 is a graph showing the reduction in peak response (dB) relative to an empty particle damper device and the percentage mass ratio.

FIG. 7 is a diagrammatic view of a particle vibration damper disposed to a workpiece undergoing a machining operation.

FIG. 8 is a further embodiment of the present invention.

FIG. 8A is a cut away section of the embodiment of the present invention shown in FIG. 8.

DETAILED DESCRIPTION OF THE INVENTION

Figure 1:
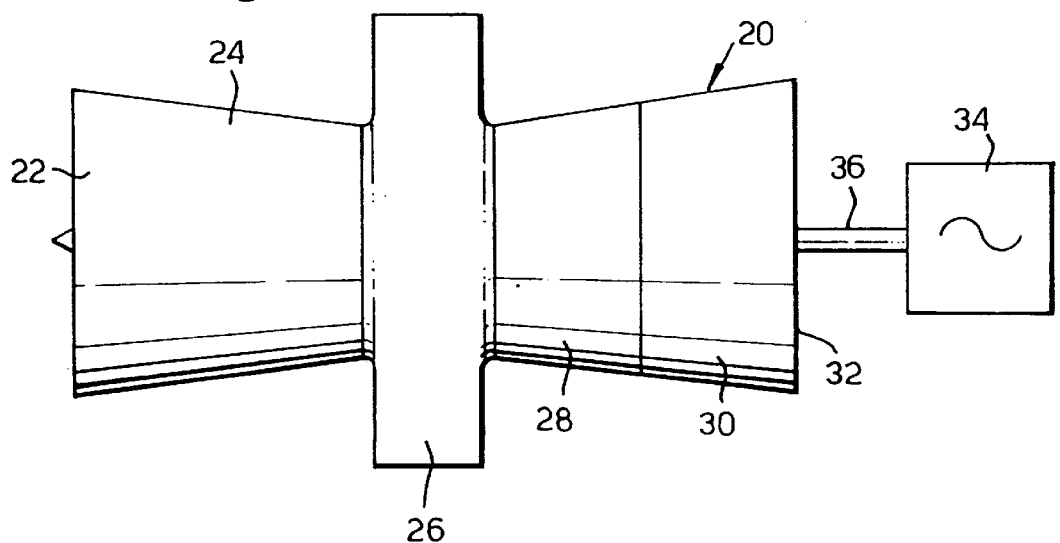
FIG. 1 is a schematic view of a gas turbine engine having a combustor system in accordance with the present invention.

With reference to FIG. 1, an industrial gas turbine engine 20 comprises, in axial flow series, an air inlet 22, a compressor 24, a combustor system 26, a turbine section 28, a power turbine system 30 and an exhaust 32. The turbine section 28 is arranged to drive the compressor section 24 via one or more shafts (not shown). The power turbine section 30 is arranged to drive an electrical generator 34, via a shaft 36. However, the power turbine section 30 may be arranged to provide drive for other purposes. The operation of the gas turbine engine 20 is conventional and will not be discussed further.

Figure 2:
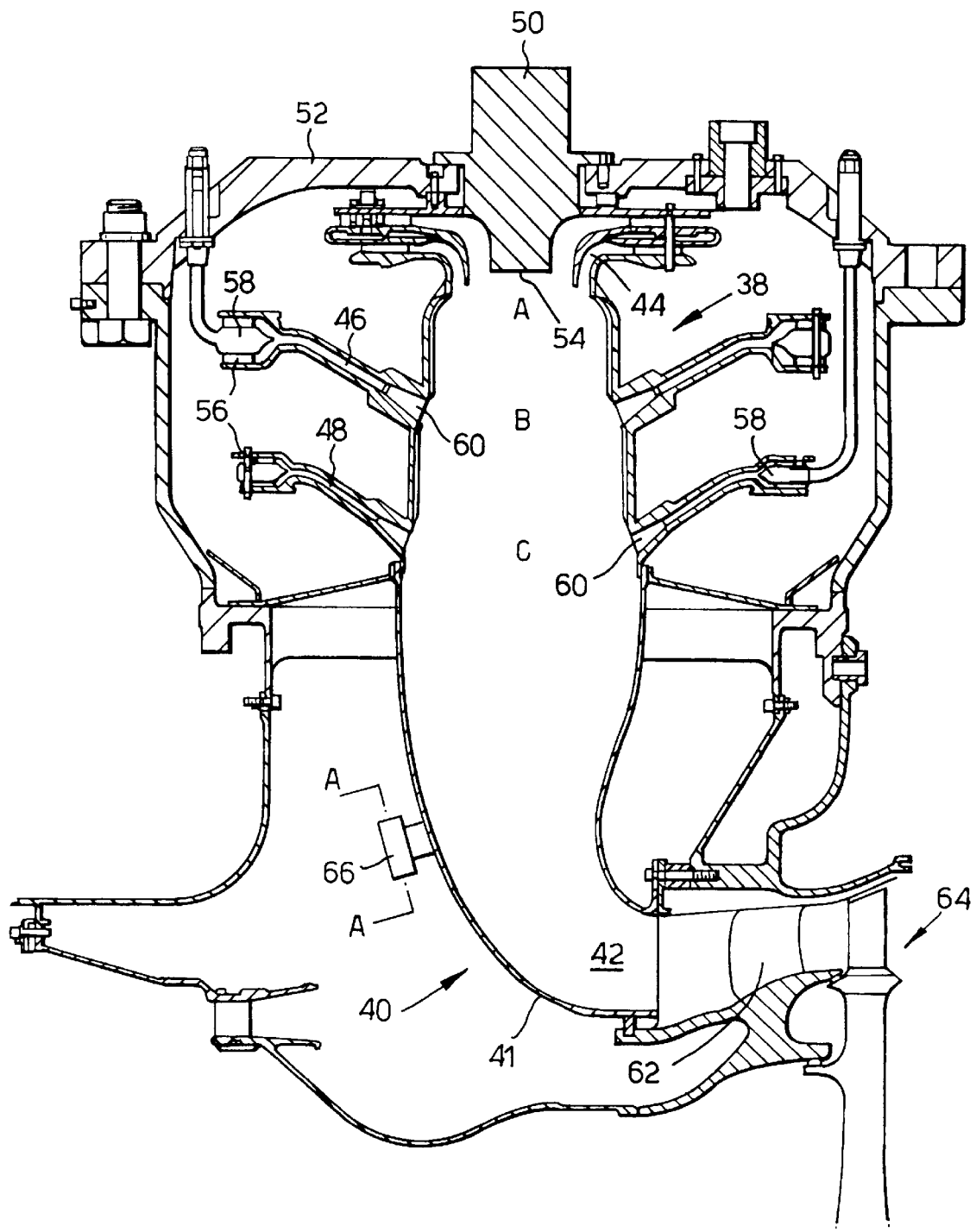
FIG. 2 is an enlarged view of the combustor system of FIG. 1 and incorporating an embodiment of the present invention.

The combustion system assembly 26 is shown more clearly in FIG. 2 and comprises a plurality of tubular combustion chambers one of which is shown at 38. The axes of the tubular combustion chambers 38 are arranged to extend in a generally radial direction. Fuel and air are mixed and enter the tubular combustion chambers 38 through inlets positioned in the generally radially outermost ends of the tubular combustion chambers 38. A transition duct 40, with wall panels 42, is connected to each of the radially innermost ends of the tubular combustion chambers 38.

Combustion of the fuel is staged in three zones A, B and C which are in flow series. To control the combustion flame temperature and hence NOx and CO emission levels fuel is premixed with air in separate premixing ducts 44, 46 and 48 for each stage.

In the primary combustion zone A fuel and air are mixed in a primary premix duct 44. Fuel is also injected from a central injector 50 located in an upstream wall 52 of each tubular combustion chamber 38 just upstream of the exit of the primary premix duct 44. Several fuel orifices (not shown) are distributed around the injector 50. The number, size and location of the orifices (not shown) are determined so as to provide the optimum combustion flame stability and combustion efficiency. A torch igniter 54, which is lit by two spark ignitors (not shown), is provided in the centre of the central igniter 50 of each tubular combustion chamber 38. A diffusion flame, initially lit by the torch igniter 54, is fuelled by the central injector 50. The flame is contained in the primary zone A and stabilised by a re-circulating flow generated by the primary premix ducts 44. The diffusion flame is intended for both starting the combustion process and minimum engine power conditions.

For an increase in power, fuel is also injected into secondary premix ducts 46 forming a uniform mixture which begins burning in the secondary zone B.

For a further increase in power, fuel is also injected into tertiary premix ducts 48 forming a uniform mixture which begins burning in the tertiary zone C.

Each of the premixing ducts 46 and 48 have a swirler 56 of an efficient aerodynamic design to accelerate the air passing therethrough and promote vigorous mixing of the air with the fuel, which is introduced at a low velocity from manifolds 58. The external profile of the manifold 58 has been optimised to give the air passing over it the best aerodynamic performance.

The secondary and tertiary premix ducts 46 and 48 each supply a fuel/air mixture to the tubular combustion chamber 38 in a ring of discrete jets which penetrate and mix with the gases from upstream stages. The discrete jets are created by aerodynamic wedges 60 whose base forms part of the wall panels 42 of the tubular combustion chamber 38.

The tubular combustion chamber 38 exhausts a jet of hot gases into a transition duct 40 which directs the flow of the hot gases into an annular array of vanes 62 and a turbine stage 64 in flow series, thereby driving the turbine section 28.

The vigorous mixing of the fuel/air flow and the burning thereof creates combustion noise over a wide range of frequencies. This phenomenon can make combustor system components 38, 40 vulnerable to high cycle fatigue if the resonant frequency of the component 38, 40 is coincident with the acoustic resonance of the burning fuel/air mix.

This is particularly so with the transition duct 40 which is susceptible to damage from noise frequencies in the range 200 Hz to 1200 Hz.

The present invention seeks to damp the vibrations of the transition duct 40 by providing a particle vibration damper 66 which is disposed to the wall panel 41 of the transition duct 40. The vibration damping device 66 is disposed to the transition duct 40 at the position of maximum amplitude, although disposing the particle vibration damper 66 proximal to the position of maximum amplitude will also provide damping.

Figure 3:
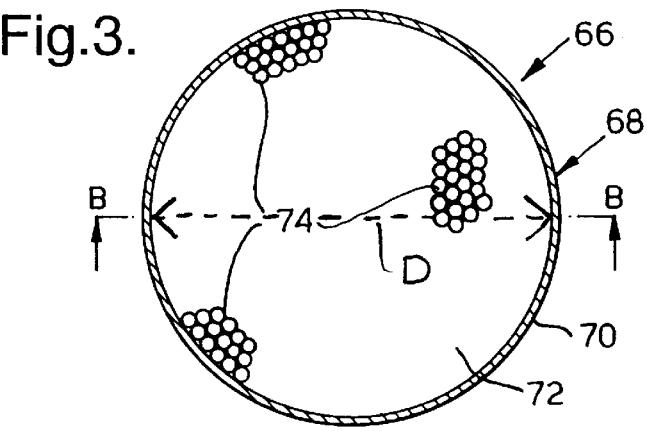
FIG. 3 is a cross section AA and enlarged view of the embodiment of the present invention shown in FIG. 2.

With reference to FIG. 3, a cross section AA and enlarged view of the embodiment of the present invention shown in FIG. 2, the particle vibration damper 66 comprises a generally cylindrical body 68, a number of walls 70 of the body 68 define a chamber 72, the chamber 72 containing a plurality of particles 74. The particles 74 are generally spherical in shape and are 0,6 millimetres in diameter. The chamber 72 has a volume of 50000 cubic millimetres. The body 68 and particles 74 are manufactured from steel. The chamber 72 is filled with 95% of particles 74 by volume. One particle vibration damper 66 is attached to the outside of the wall panel 42 of the transition duct 40.

The volume fill is defined as a percentage of the maximum theoretical density of particles 74 fully occupying a given volume. Thus a 95% volume fill represents 95% of the volume of particles 74 when at their maximum theoretical density in that given volume. In practice this is achieved by filling the chamber 72 with particles 74 and vibrating the particle damper 66 so that the particles 74 achieve their maximum density. More particles 74 are then added to the particle damper 66 and further vibrated to compact the particles 74 to the maximum density. This process is continued until the chamber 72 of the particle damper 66 is completely full. The particles 74 (and the damper 66 if the weight of the damper 66 is known) are then weighed and percent of the weight of the particles 74 are then removed. It should be noted that for any given density of particles 74 of a given volume a 95% fill by volume is equivalent to a 95% fill by weight.

Figure 4:
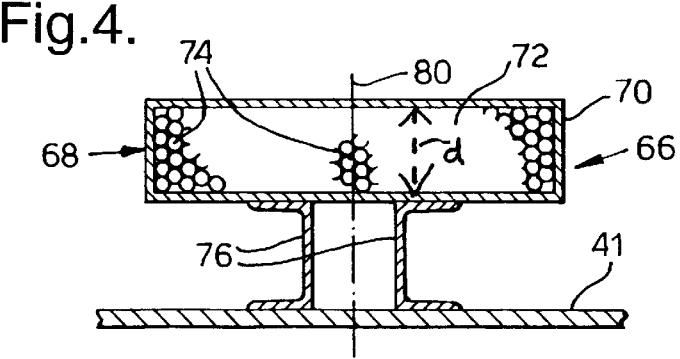
FIG. 4 is a cross section BB of the embodiment of the present invention shown in FIG. 2.

With reference to FIG. 4, a cross section BB of the embodiment of the present invention shown in FIG. 3, the particle vibration damper 66 comprises a pedestal 76. The pedestal 76 is designed to transmit vibratory amplitudes from the transition duct 40 to the body 68 of the particle vibration damper 66 whilst maintaining a space between the body 68 and the transition duct 40. The cooling air flow around the combustor chamber 38 also acts to cool the particle vibration damper 66. Cooling of the particle vibration damper 66 is not essential, but is preferred. The pedestal 76 is not an essential feature of the particle vibration damper 66, but it is preferred. It is preferable to position the particle vibration damper 66 so that its polar axis 80 is orientated parallel to the principal vibratory displacement direction of the wall 41 of the transition duct 40.

During recent experimentation it has been established that there are certain important design parameters associated to optimising the design of the particle damper device 66. Referring to FIG. 5, for the cylindrical particle damper device 66 (shown on FIGS. 3 and 4), D is the diameter and d is the depth (that dimension parallel to the polar axis 80) of the device 66. For a 95% particle 74 filled damper device 66, if D/d>5 the particles 74 do not enter a gas phase as the vibration energy (power input) increases and the effective damping does not reduce by going through a minimum as when D/d<5. This minimum relates to the relationship between the reduction in peak response (dB) relative to an empty particle damper 66 and power input. The minimum being the greatest reduction of peak response through a range of power inputs. Where D/d<5 the effectiveness of the device 66 reaches a minimum and thereafter the reduction in peak response diminishes and the particle damper 66 becomes relatively less effective as the power input increases from the minimum.

Referring to FIG. 6, which shows the relationship between the reduction in peak response (dB) relative to an empty particle damper 66 and the percentage mass ratio. The percentage mass ratio being given by the percentage of particle 74 mass to the mass of the vibrating structure plus the particle damper 66. In this case the vibrating structure is a metal plate (not shown). FIG. 6 shows the general trend of increasing the reduction in peak response through increasing the percentage of particle 74 mass. This trend is associated to particle dampers 66 and particles 74 of various geometries and materials.

Therefore, as disclosed herein, the design of a particle damper 74 may be optimised by consideration of: particle 74 percentage fill; percentage of particle 74 mass; and geometry of the particle damper 66. In addition, the particle 74 size and inter-particle 74 frictional characteristics and material types used for both the particles 74 and the damper 66 are also factors in the design of the optimum particle damper device 66.

It is believed that the particle vibration damper 66 operates by particle 74 interface contact friction whereby the frictional forces are dependent upon material type and contact forces, the contact forces being governed by the vibratory accelerations of the wall 41. Under specific vibrations a particle 74 will attempt to migrate from say, one face 68 of the vibration damper device 66 to the opposite face 68 in a direction generally parallel to the polar axis 80, and return each particle 74 competing with the other particles 74 for their migratory position. Three analogous phases of particle 74 movement may be identified, solid, liquid and gas, each phase appears to be dependent on the volume fill of the chamber 72 with particles 74. The gas phase can only occur, for this embodiment of the 15 present invention, if the particles 74 can behave like molecules in a gas which requires that the volume fill is well below 95%. The fluid phase of motion is where the particles 74 'fluidise' and the motion of the particles is similar to a viscous liquid, at least one free surface is required. The solid phase is where the particles 74 migrate around the chamber 72 without colliding or fluidising and requires almost a full volume fill. It is believed that the most effective damping region is the boundary between the solid and fluid phase, for the present invention this being a 95% volume fill of the chamber 72 with particles 74. It is believed that vibratory energy is dissipated by the inter-particle 74 frictional forces thus providing damping to vibrations.

Although vibrating structures having chambers with a particle 74 volume fill will reduce the vibrations of a vibrating structure to a limited extent it is particularly beneficial to have a particle volume fill greater than or equal to 95% but less than 100%. However, it is believed that for certain greater particle sizes a particle volume fill of 90% or greater may be sufficient to promote the necessary fluidised particle behaviour. This percentage fill range is particularly important in that the particles 74 behave analogous to a fluid phase rather than in an analogous gas phase.

With reference to the present invention a method of damping the vibrations of a transition duct 40 of a gas turbine engine 20 is disclosed. The method comprising the steps of, locating the position of the greatest amplitude of vibration on the transition duct 40 and disposing a particle vibration damper 66 on the transition duct 40 at the position of the greatest amplitude of vibration.

Although the present invention has been described with reference to the particle vibration damper 66 disposed on to the pedestal 76 and the pedestal 76 disposed to the engine component 40, the particle vibration damper 66 may be disposed directly to the wall 41 of the transition duct 40.

Although the present invention has been described with reference to the particle vibration damper 66 disposed on or in an engine component 40 of an industrial gas turbine engine 20, the particle vibration damper 66 may be disposed on or in a non-rotating component 38 of any form gas turbine engine.

Although the present invention has been described with reference to the particle vibration damper 66 attached to a transition duct 40, the particle vibration damper 66 may be attached to the tubular combustion chamber 38 or an annular distribution chamber (not shown).

Although the present invention has been described with reference to the particle vibration damper 66 having a chamber 72, two or more chambers 72 may be provided each filled with a plurality of particles 74.

Although the present invention has been described with reference to the particle vibration damper 66 having a chamber 72 filled with a plurality of particles 74 of substantially the same size, the chamber 72 may be filled with a plurality of particles 74 of more than one discrete size. Similarly each of the chambers 72 may be filled either with a plurality of particles 74 of the same discrete size, different discrete sizes in each chamber 72 or a number of discrete sizes within each chamber 72.

Although the present invention has been described with reference to a plurality of particles 74 with a diameter of 0.6 millimeters, the plurality of particles 74 may have a diameter in the range of 0.1 to 5.0 millimeters.

Although the present invention has been described with reference to a plurality of particles 74 which are metallic the plurality of particles 74 may be ceramic. Similarly, although the present invention has been described with reference to the particle vibration damper being manufactured from metal, in particular steel the particle vibration damper may be manufactured from ceramic material.

Although the present invention has been described with reference to the chamber 72 being partially filled with a plurality of particles 74 the chamber 72 or chambers 72 may be filled specifically to 95 percent by volume.

Although the present invention has been described with reference to the chamber 72 being partially filled with a plurality of particles 74 each of the chambers 72 may be filled to a different percentage by volume.

Although the present invention has been described with reference to a substantially cylindrically shaped particle vibration damper 66, a parallelepiped shaped particle vibration damper 66 may be used or any other shaped body 68.

Moreover, although the present invention has been described with reference to one particle vibration damper 66 being attached to the outside of the wall panel 42 of the transition duct 40 more than one may be attached to each transition duct 40 or other engine component.

Although the particle vibration damper 66 has been described with reference to attenuating vibrations of non-rotating components 38, 40 of a gas turbine engine 10, is also highly effective in damping vibrations, of components such as a workpiece or tool, derived from a machining process.

Referring to FIG. 7, which shows a second application of the particle vibration damper 66, the component is a workpiece 78 subject to a machining operation. In this embodiment the machining operation is milling, the machine 80 drives a rotating milling tool 82, which removes material from the workpiece 78, to form the desired shape and surface finish thereof.

During the machining operation it is common for chatter to occur if the tooling or workpiece are of insufficient rigidity. Chatter is the vibration of the milling tool relative to the workpiece which results in either a reduction in the quality of the surface finish being machined or an increase in the machining process time where a better surface finish is required. For example, during the manufacture of aero-engine blisks this is of particular importance as the tough nature of the material, titanium, to be machined and the flexibility and low inherent damping of the workpiece 78 severely curtails machining rates.

The workpiece 78 may be any industrially manufactured item which undergoes some form of machining process, for example milling, cutting, turning, drilling, broaching, riveting or grinding that may result in the workpiece 78 vibrating. The object of the present invention being to provide vibration damping to such an item during such a machining process.

It is desirable for the particle vibration damper 66 to be disposed to the workpiece 78 by temporary attachment means (not shown). The temporary attachment means may comprise any conventional attachment means as known in the art and be a form of a clip mechanism, a conventional strap secured by Velcro™ or buckle, welding, soldering, a screw thread, a bayonet type fitting, an interference fit arrangement, a suction pad or by magnetic means. All types of fitting having the common general purpose of temporarily attaching the vibration particle damper 66 to the vibrating structure 78. The particle vibration damper 66 may also be applied to the tool 82 of the machine, or to the machine 80 itself, to damp the vibrations thereof in a similar manner.

Application of the particle vibration damper 66 to a workpiece 78, tool 82 or machine 80 has the additional advantage of attenuating acoustic emissions derived during the machining process.

FIG. 8 shows a further embodiment of the present invention and relates to the application of the particle vibration damper 90 to a fuel injector 82 of a gas turbine aero-engine (not shown). Fuel burning within the combustor chamber 88 causes pressure fluctuations therein which in turn oscillate the fuel injector 84. The fuel injector 84 and fuel pipes 86 are caused to vibrate at many different frequencies. Therefore, there is a requirement to damper the vibrations of the fuel injector 84. In this embodiment of the present invention a substantially circular particle damper 90 is disposed to a section of the injector 84. As shown in FIG. 8A, the particle damper 90 comprises two partially circular chambers 92, however, the arrangement and number of the chambers 92 may be altered to suit any particular application. Each chamber 92 comprises a plurality of particles 74 with a volume fill as describe hereinbefore. Each chamber 92 may be a particular size, have a certain volume fill of particles 74 with different particle 74 sizes thereby damping different modes and frequencies of vibrations. It is advantageous to dispose the particle damper 90 to the radially outermost part of the fuel injector 84 so that the maximum vibrational accelerations are experienced and thereby optimum damping achieved.

This embodiment of the particle damper 90 may also be similarly applied to other vibrating components, for example a fuel pipe 86 of a gas turbine engine (not shown). The particle damper 90 may be attached to the fuel pipe 86 or the fuel injector 84 by temporary attachment means as described hereinbefore. The temporary attachment means I particularly useful for these applications so that the position of the particle damper 90 is readily moveable to the optimum position of greatest vibratory amplitude for any chosen frequency.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A particle vibration damper for damping the vibrations of a vibrating component comprising a body having a chamber and a plurality of particles, the particle vibration damper, in use, being associated with a vibrating component, wherein the chamber is filled with particles to a percentage between 95% and 100% volume fill such that the particles act like a fluid due to the vibrations of the vibrating component wherein the vibration damper is cylindrical and has a diameter of a selected dimension and a thickness of another dimension and the ratio of the diameter to said thickness is greater than 5.

2. A particle vibration damper for a vibrating component as claimed in claim 1 wherein the body has a plurality of chambers.

3. A particle vibration damper for a vibrating component as claimed in claim 2 wherein each chamber is partially filled with particles of substantially the same size.

4. A particle vibration damper for a vibrating component as claimed in claim 2 wherein each chamber is partially filled with particles of more than one discrete size.

5. A particle vibration damper for a vibrating component as claimed in claim 2 wherein each of the chambers is partially filled with a plurality of particles of substantially the same size, each plurality of particles in each chamber being of a different discrete size.

6. A particle vibration damper for a vibrating component as claimed in claim 3 wherein each of the chambers is filled with particles to 95 percent by volume.

7. A particle vibration damper for a vibrating component as claimed in claim 2 wherein each of the chambers is filled with particles to a different percentage by volume of each chamber.

8. A particle vibration damper for a vibrating component as claimed in claim 1 wherein the particles are substantially spherical.

9. A particle vibration damper for a vibrating component as claimed in claim 8 wherein the particles are substantially spherical with a diameter in the range of 0.1 to 5.0 millimeters.

10. A particle vibration damper for a vibrating component as claimed in claim 8 wherein the particles are substantially spherical with a diameter of 0.6 millimeters.

11. A particle vibration damper for a vibrating component as claimed in claim 1 wherein the vibrating component is any one of the group comprising a workpiece, a machine tool, a machine.

12. A particle vibration damper for a vibrating component as claimed in claim 11 wherein the workpiece is subject to a machining operation.

13. A particle vibration damper for a vibrating component as claimed in claim 1 wherein the particle vibration damper further comprises a pedestal and the particle vibration damper is mounted on the pedestal, the pedestal attached to the vibrating component.

14. A particle vibration damper for a vibrating component as claimed in claim 1 wherein the particles are metallic.

15. A particle vibration damper for a vibrating component as claimed in claim 1 wherein the particles are ceramic.

16. A particle vibration damper for a vibrating component as claimed in claim 1 wherein the chamber is filled with particles to between 95 and 100 percent by volume.

17. A particle vibration damper for a vibrating component as claimed in claims 1 wherein the chamber is filled with particles to 95 percent by volume.

18. A particle vibration damper for a vibrating component as claimed in claim 1 wherein the body of the particle vibration damper is metallic.

19. A particle vibration damper for a vibrating component as claimed in claim 1 wherein the body of the particle vibration damper is ceramic.

20. A particle vibration damper for a vibrating component as claimed in claim 1 wherein the body of the particle vibration damper is substantially cylindrical.

21. A particle vibration damper for a vibrating component as claimed in claims 1 wherein the body of the particle vibration damper is substantially parallelepiped.

22. A particle vibration damper for a vibrating component as claimed in claim 1 wherein the body of the particle vibration damper comprises a chamber with a volume of 50000 cubic millimetres.

23. A particle vibration damper for a vibrating component as claimed in claim 1 wherein the vibrating component is an engine component, the engine component is any one of the group comprising a transition duct, a combustion chamber.

24. A particle vibration damper for a vibrating component as claimed in claim 1 wherein the particle vibration damper is disposed to the vibrating components by temporary means.

25. A particle vibration damper for a vibrating component as claimed in claim 1 wherein the component, of the gas turbine engine, vibrates in the frequency range 200–1200 Hertz.

26. A particle vibration damper for a vibrating component as claimed in claim 1 wherein the gas turbine engine is any one of the group comprising an industrial gas turbine engine, a gas turbine engine for an aircraft, a gas turbine engine for a ship.

27. The particle vibration damper as claimed in claim 1 wherein said particles are metallic spheres.

* * * * *